(12) United States Patent
Sawada et al.

(10) Patent No.: US 9,586,731 B2
(45) Date of Patent: Mar. 7, 2017

(54) LID OPENING/CLOSING MECHANISM

(71) Applicant: TOYODA GOSEI CO., LTD., Kiyosu-shi, Aichi-ken (JP)

(72) Inventors: Shinichi Sawada, Kiyosu (JP); Nobuhiko Yokota, Kiyosu (JP); Kunihito Kondo, Nisshin (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/599,628

(22) Filed: Jan. 19, 2015

(65) Prior Publication Data
US 2015/0274383 A1    Oct. 1, 2015

(30) Foreign Application Priority Data

Mar. 25, 2014  (JP) .................. 2014-061163

(51) Int. Cl.
| | |
|---|---|
| *B60N 3/10* | (2006.01) |
| *B65D 43/26* | (2006.01) |
| *B60R 7/06* | (2006.01) |
| *B65D 43/14* | (2006.01) |
| *E05F 5/00* | (2006.01) |
| *B60R 11/00* | (2006.01) |
| *B60R 7/04* | (2006.01) |
| *E05F 1/12* | (2006.01) |

(52) U.S. Cl.
CPC .............. *B65D 43/26* (2013.01); *B60N 3/102* (2013.01); *B60R 7/06* (2013.01); *B65D 43/14* (2013.01); *E05F 5/00* (2013.01); *B60R 7/04* (2013.01); *B60R 2011/0005* (2013.01); *E05F 1/1269* (2013.01); *E05Y 2900/538* (2013.01)

(58) Field of Classification Search
CPC ..... B60R 7/06; B60R 2011/0005; B60R 7/04; B65D 43/26; B65D 43/14; B60N 3/102; E05F 5/00; E05F 1/1269; E05Y 2900/538
USPC .......................................... 220/830; 224/483
See application file for complete search history.

(56) References Cited

U.S. PATENT DOCUMENTS

| | | | |
|---|---|---|---|
| 7,063,225 B2 | 6/2006 | Fukuo |
| 7,765,642 B2 | 8/2010 | Fukuo |
| 7,766,407 B2 | 8/2010 | Nakaya |
| 8,186,734 B2 | 5/2012 | Nakaya |

(Continued)

FOREIGN PATENT DOCUMENTS

| | | |
|---|---|---|
| JP | 2004-025967 A | 1/2004 |
| JP | 3833925 B2 | 7/2006 |

(Continued)

*Primary Examiner* — James N Smalley
(74) *Attorney, Agent, or Firm* — Posz Law Group, PLC

(57) ABSTRACT

A lid opening/closing mechanism includes an arm, an arc-shaped gear, a first fixed gear, a damper, a second fixed gear, and a tension spring. The arm is disposed integrally to project from the lid to swing about a swing center as the lid opens and closes. The arc-shaped gear is formed in the arm. The first fixed gear is disposed in the body, and meshes with the arc-shaped gear. The damper is disposed in the arm, and includes a damper gear. The second fixed gear is disposed in the body, is formed along a movement locus of the damper moving as the lid moves to open and close, and meshes with the damper gear. The tension spring is disposed between the body and the arc-shaped gear to urge the lid in an opening direction.

10 Claims, 7 Drawing Sheets

(56) References Cited

U.S. PATENT DOCUMENTS

| | | | |
|---|---|---|---|
| 8,556,118 B2 | 10/2013 | Hamaguchi | |
| 2006/0290144 A1* | 12/2006 | Nakaya | B60N 3/08 292/262 |
| 2007/0034636 A1* | 2/2007 | Fukuo | B60R 7/06 220/830 |
| 2012/0104011 A1 | 5/2012 | Tsunoda | |

FOREIGN PATENT DOCUMENTS

| | | |
|---|---|---|
| JP | 2007-2556 A | 1/2007 |
| JP | 2009-248793 A | 10/2009 |
| JP | 2009-249945 A | 10/2009 |
| JP | 2010-242794 A | 10/2010 |
| JP | 2010-247565 A | 11/2010 |

* cited by examiner

LID OPENING/CLOSING MECHANISM

INCORPORATION BY REFERENCE

The present invention is based on Japanese Patent Application No. 2014-061163, filed on Mar. 25, 2014, the entire contents of which are incorporated herein by reference.

BACKGROUND OF THE INVENTION

Field of the Invention

The present invention relates to a lid opening/closing mechanism.

Description of the Related Art

A cup holder having been available heretofore conventionally to be installed within a vehicular passenger room is equipped with a body having an opening, and a lid opening and closing the opening. One of the cup holders is hereinafter described while taking such a cup holder as disclosed in Japanese Patent Gazette No. 4258175 (or Japanese Unexamined Patent Publication (KOKAI) Gazette No. 2004-25967), for instance, as an example. In the cup holder disclosed in the gazette, a pinion 915 formed in a lid 94 is meshed with a rack 913 fixed to a body 93, as shown in FIG. 9. Moreover, a link arm 95 is supported rotatably at one of the opposite ends by a first swing shaft 911 formed in the body 93, and is connected at the other one of the opposite ends with a second swing shaft 912 formed in the lid 94. Accordingly, the pinion 915 of the lid 94 rotates along the rack 913, and simultaneously therewith the second swing shaft 912 of the lid 94 moves up and down as the link arm 95 swings. Consequently, it is possible to make smaller a swing locus of the lid 94 moving as the lid 94 opens and closes, because the second swing shaft 912 moves up and down.

In the cup holder disclosed in Japanese Patent Gazette No. 4258175 (or Japanese Unexamined Patent Publication (KOKAI) Gazette No. 2004-25967), it is possible to urge the lid 94 in the opening direction in the following manner, for instance. As illustrated in FIG. 10, a torsion coil spring 96 is wound around the second swing shaft 912 of the lid 94. Then, the torsion coil spring 96 is locked to the lid 94 at one of the opposite ends 96a, and is further locked to the body 93 at the other one of the opposite ends 96b.

However, the torsion coil spring 96 thus assembled with the lid 94 exhibits a small opening angle or magnitude. Accordingly, the torsion coil spring 96 applies a weak initial torque to the lid 94 when the lid 94 is pushed up from the closed condition. Consequently, a plate spring is disposed adjacent to the top end of the body 93 to give an auxiliary or supplemental urging force to the lid 94 in the pushed-up direction. Therefore, it has been necessary to reinforce the initial torque that the torsion coil spring 96 produces.

Moreover, providing the lid 94 with a damper for easing or relieving the revolving speed of the lid 94 enables the lid 94 to open and close stably. However, the damper rotates only by a less number of revolutions because the lid rotates by a small rotational angle. Hence, it is difficult for the damper to move the lid 94 at an eased or relieved revolving speed.

However, the following patent literatures, for example, disclose cup holders provided with a damper for easing or relieving the opening and closing speeds of a lid: Japanese Unexamined Patent Publication (KOKAI) Gazette No. 2010-247565, Japanese Unexamined Patent Publication (KOKAI) Gazette No. 2010-242794, Japanese Unexamined Patent Publication (KOKAI) Gazette No. 2009-249945, Japanese Unexamined Patent Publication (KOKAI) Gazette No. 2009-248793, Japanese Unexamined Patent Publication (KOKAI) Gazette No. 2007-2556, and Japanese Patent Gazette No. 3833925.

SUMMARY OF THE INVENTION

The present invention has been developed in view of the above circumstances. It is therefore an object of the present invention to provide a lid opening/closing mechanism enabling a lid to open and close smoothly. In order to achieve the objective, the present inventors have been earnestly seeking for structures for opening and closing a lid smoothly, and have eventually resulted in devising an opening/closing structure with a novel construction that has not been heretofore available conventionally.

For example, a lid opening/closing mechanism according to the present invention is an opening/closing mechanism for a lid opening and closing an opening formed in a body, and the present lid opening/closing mechanism comprises:

an arm disposed integrally to project from the lid to swing about a swing center as the lid opens and closes;

an arc-shaped gear formed in the arm;

a first fixed gear disposed in the body, and meshing with the arc-shaped gear;

a damper disposed in the arm, and including a damper gear;

a second fixed gear disposed in the body, formed along a movement locus of the damper moving as the lid moves to open and close, and meshing with the damper gear; and a tension spring disposed between the body and the arc-shaped gear to urge the lid in an opening direction.

The thus constructed lid opening/closing mechanism according to the present invention comprises the arc-shaped gear formed in the arm of the body to mesh with the first fixed gear formed in the body, and the damper disposed in the arm and including the damper gear to mesh with the second fixed gear. Hence, the arc-shaped gear and the first fixed gear meshing one another, and the damper gear and the second fixed gear meshing one another hold the lid onto the body.

The arc-shaped gear formed in the arm meshes with the first fixed gear, and moves back and forth in the gear-teeth arrangement direction of the first fixed gear. Accordingly, the arm swings while moving back and forth in the gear-teeth arrangement direction of the first fixed gear, thereby opening and closing the lid. The damper interlocks with the thus moving arm to move back and forth in the gear-teeth arrangement direction of the second fixed gear. Consequently, the first fixed gear and second fixed gear move the arm to open and close the lid while holding the arm.

Making a length of the second fixed gear longer in the gear-teeth arrangement direction results in enabling the damper to adjust the moving speed of the lid over a longer distance. Accordingly, it is possible to rotate the damper gear of the damper in an increased number of revolutions when opening and closing the lid. Consequently, it is possible to control the moving speed of the lid freely at will. Therefore, it is possible to open and close the lid smoothly.

Moreover, changing the gear-teeth arrangement direction of the first fixed gear makes it possible to change the swing locus of the arm. Accordingly, it is possible to reduce a width of the swing locus of the arm moving as the lid opens and closes. Consequently, it is possible to reduce the space required for the entire lid opening/closing mechanism according to the present invention.

In addition, the lid opening/closing mechanism according to the present invention comprises the tension spring serving as an urging member for urging the lid in the opening direction. The tension spring has a larger tensile force relatively than do torsional coil springs. Accordingly, the tension spring makes it possible to enlarge an initial torque, which is required when moving the lid from the closed position to the opened position, in the lid-opening direction. Consequently, it is possible to open the lid smoothly, without using any auxiliary or supplementary spring for supplementing the initial torque.

The lid opening/closing mechanism according to the present invention comprises the lid including the arm and arc-shaped gear, the body including the first fixed gear and second fixed gear, the damper and the tension spring, all of which enables the lid to open and close smoothly. Not only the present opening/closing mechanism has less number of component parts but also it can be assembled with less man-hour requirements, because it is free from the link arms that have been heretofore needed conventionally.

Moreover, it is preferable that the second fixed gear can be placed on an opposite side to the first fixed gear with the arm interposed therebetween. Thus, the first fixed gear, and the second fixed gear can hold the arm more stably.

In addition, it is preferable that the lid opening/closing mechanism according to the present invention can further comprise: a fitting disposed to project from the arm; and a guide groove which is formed in the body, into which the fitting is fitted movably, and which extends along a movement locus of the fitting moving as the lid moves to open and close. The fitting disposed to project from the arm moves along the guide groove formed in the body. As a result, the arm can swing more smoothly and without getting rickety or wobbly.

In the above preferable lid opening/closing mechanism according to the present invention, it is more preferable that the fitting can be placed at the swing center of the arm, and that the guide groove can extend in parallel with the first fixed gear. In this instance, the arm swings about the fitting serving as the center. Moreover, the guide groove supports the fitting, the swing center of the arm.

As described above, the lid opening/closing mechanism according to the present invention enables operators or users to open and close the lid smoothly.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Figure 1:
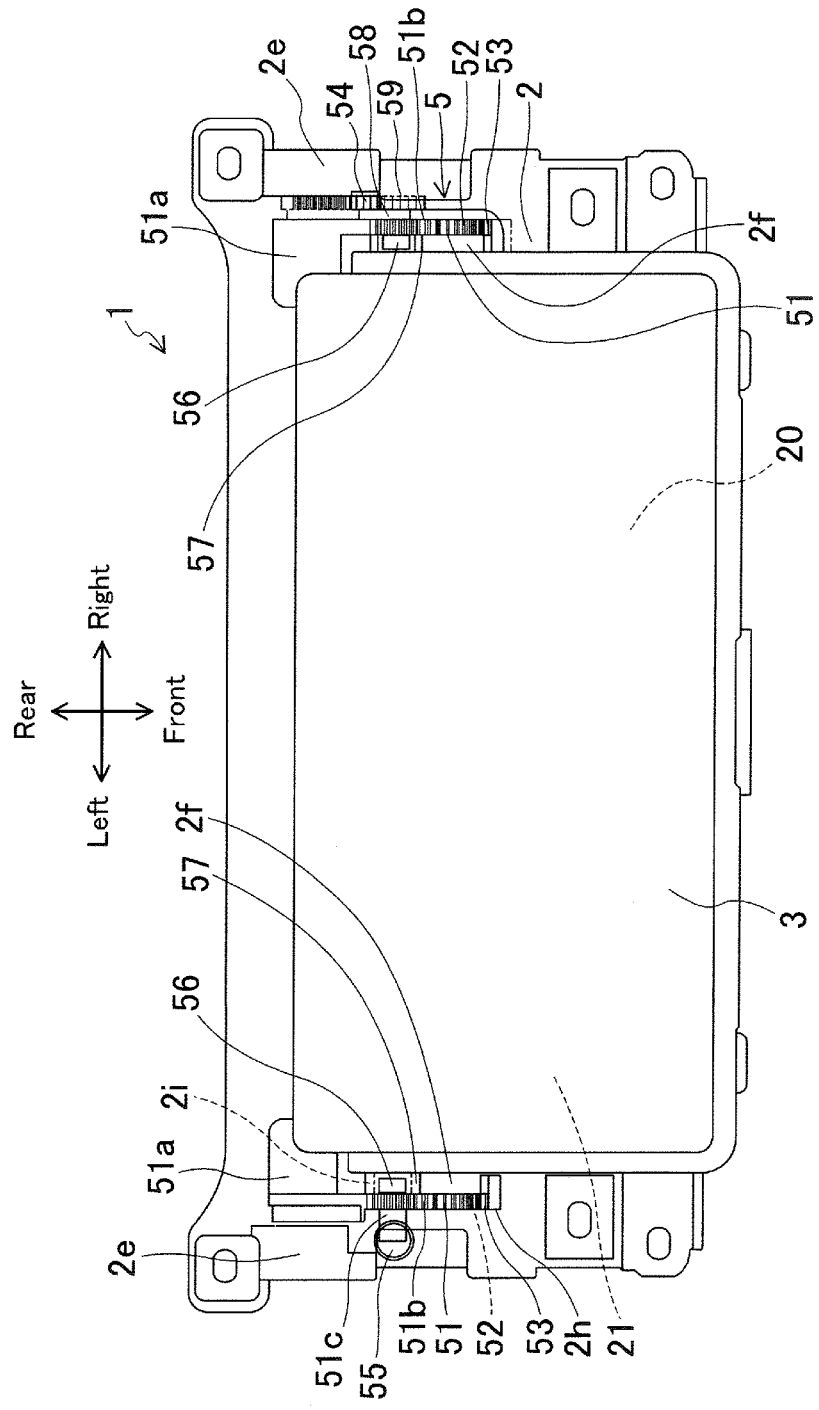
FIG. 1 is a plan view illustrating a cup holder according to Embodiment, which comprises a lid opening/closing mechanism according to the present invention.

A lid opening/closing mechanism according to Embodiment of the present invention is disposed in a cup holder to be installed within a vehicular passenger room. As illustrated in FIG. 1, a cup holder 1 comprises a body 2, a lid 3, and an opening/closing mechanism 5. The body 2 has an opening 20. The lid 3 opens and closes the opening 20. The opening/closing mechanism 5 opens and closes the lid 3.

Figure 2:
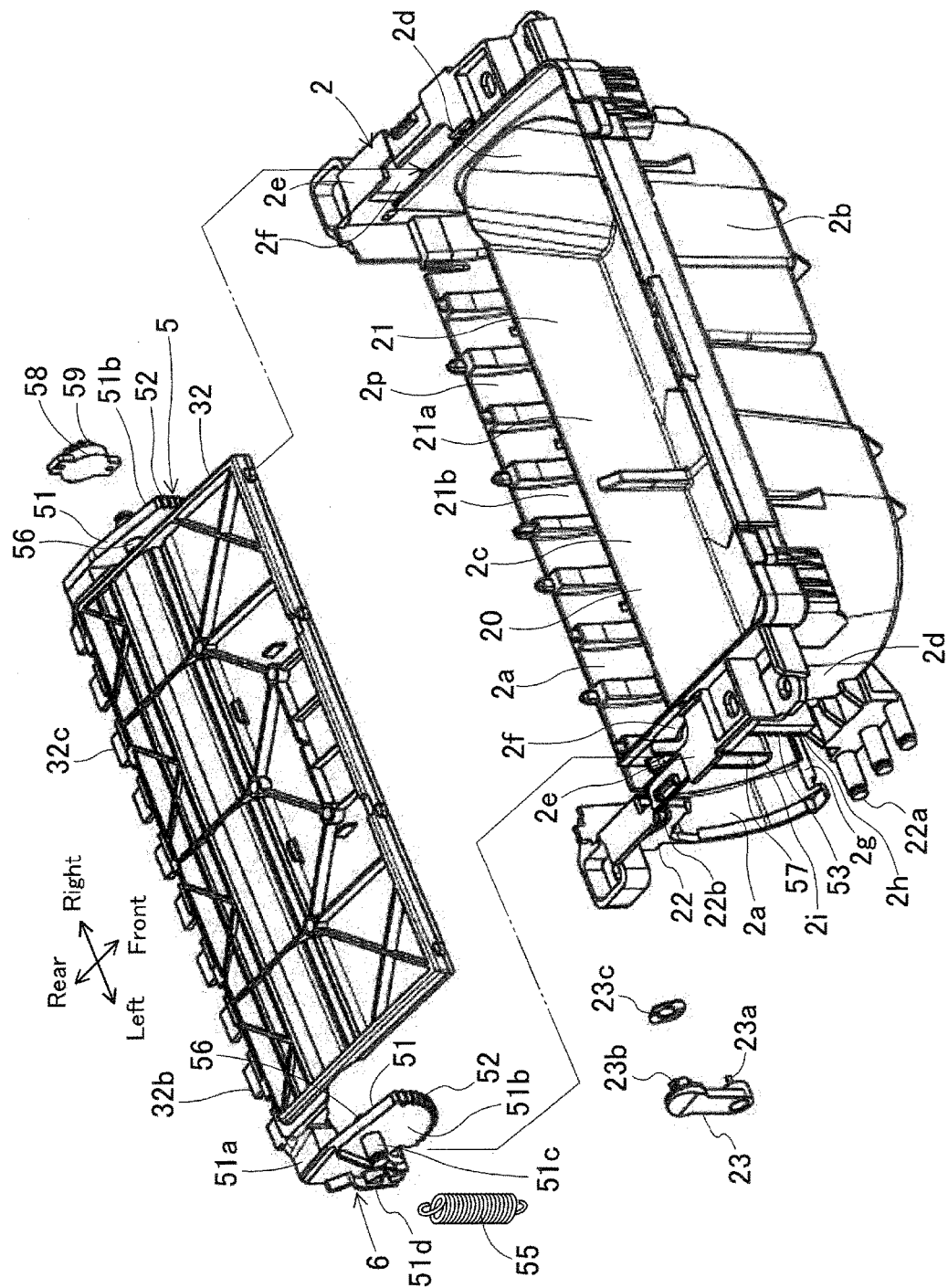
FIG. 2 is an exploded perspective view illustrating the cup holder according to Embodiment.

As illustrated in FIG. 2, the body 2 is formed as a boxed configuration, and comprises an accommodation space 21 having the opening 20. The accommodation space 21 includes a container accommodation unit 21a, and a lid accommodation unit 21b. The container accommodation unit 21a accommodates beverage containers therein. The lid accommodation unit 21b accommodates the opened lid 3 therein. A frontward wall 2b, a rearward wall 2c, and sideward walls (2d, 2d) surround the front side, rear side and rightward and leftward sides of the container accommodation unit 21a, respectively. The rearward wall 2c of the container accommodation unit 21a, and an arc-shaped wall 2a surround the lid accommodation unit 21b. The arc-shaped wall 2a is formed on the rearward side of the rearward wall 2c, and is curved like a circular arc. The body 2 is provided with furnishing units (2e, 2e). Note that the furnishing units (2e, 2e) help furnish a peripheral mating or vehicular member with the cup holder 1. The furnishing units (2e, 2e) are put on more rightward and leftward outer sides of the body 2 than are the sideward walls (2d, 2d). Insertion holes (2f, 2f) are opened between the sideward walls (2d, 2d) and the furnishing units (2e, 2e), respectively. The insertion holes (2f, 2f) are designed to insert later-described arms (51, 51) of the lid 3 between the sideward walls (2d, 2d) and the furnishing units (2e, 2e).

Figure 3:
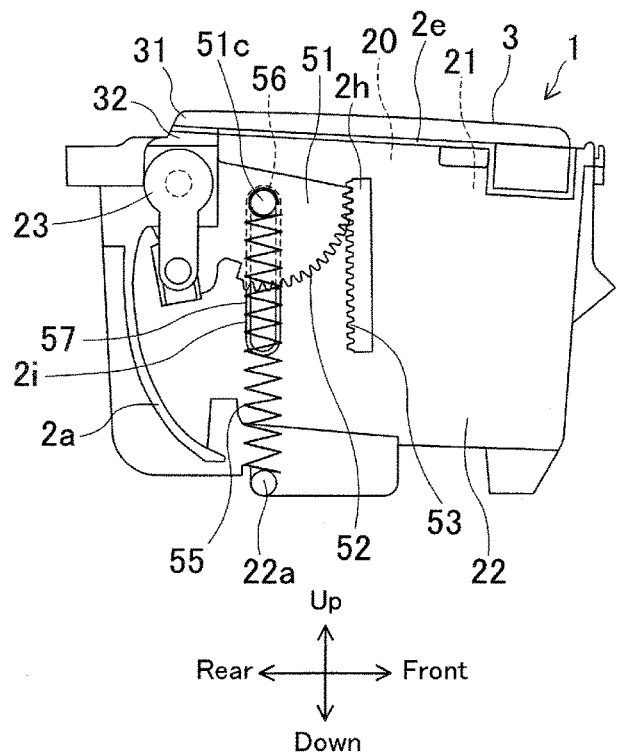
FIG. 3 is a left-side view illustrating the cup holder according to Embodiment when its lid is closed.

As illustrated in FIGS. 2 and 3, the lid 3 covers the opening 20 in the body 2 in an openable/closable manner. The lid 3 comprises an upper-plate member 31, and a lower-plate member 32. The upper-plate member 31 is fitted into the lower-plate member 32 so that the respective peripheral rims abut against one another. The lower-plate member 32 has a rear end 32b including a number of bulged elements 32c. The bulged elements 32c extend along the swing locus of the rear end 32b. The bulged elements 32c are formed as a configuration in compliance with a configuration of a number of dented grooves 2p that are formed in the arc-shaped wall 2e of the body 2. Small articles are prevented from falling down into spaces between the rear end 32b of the lid 3 and the arc-shaped wall 2e of the body 2, because the bulged elements 32c are conformed to the dented grooves 2p. Moreover, the arc-shaped wall 2b of the body 2 guides the rear end 32b of the lid 3 when the rear end 32b is moving, because the bulged elements 32c of the lid 3 move along the dented grooves 2p of the arc-shaped wall 2b.

As illustrated in FIGS. 1 and 2, the opening/closing mechanism 5 comprises arms (51, 51), arc-shaped gears (52, 52), first fixed gears (53, 53), a second fixed gear 54, a tension spring 55, and a damper 58. The arms (51, 51) are disposed on the lid 3. The arc-shaped gears (52, 52) are formed in each of the arms (51, 51). The first fixed gears (53, 53) and second fixed gear 54 are formed in the body 2.

As illustrated in FIG. 2, the arms (51, 51) are disposed to project from the right and left opposite sides of the lower-plate member 32 in the lid 3, respectively. Each of the arms (51, 51) comprises a connector section 51a, and a sector-shaped thin-plate section 51b. The connector sections (51a, 51a) protrude outward from the right and left opposite sides of the lid 3, respectively. The sector-shaped thin-plate sections (51b, 51b) are disposed at the leading end of the connector sections (51a, 51a), respectively. The thin-plate sections (51b, 51b) are formed as a sector-like thin-plated configuration, respectively. The thin-plate sections (51b, 51b) are inserted into the insertion holes (2f, 2f) in the body 2 to face the sideward walls (2d, 2d), respectively. The thin-plate sections (51b, 51b) are provided with an arc-shaped gear 52 on the peripheral rim, respectively. The arc-shaped gears (52, 52) are formed as a circular arc shape arcing downward from the front side to the rear side, respectively, as shown in FIGS. 2, 3, 5, 6 and 7. The rotary center of the arc-shaped gears (52, 52) in the thin-plate sections (51b, 51b) makes the swing center of the arms (51, 51). At the rotary center of the arc-shaped gears (52, 52) in the thin-plate sections (51b, 51b), fittings (56, 56) are disposed to project in the right and left directions toward the inner side of the lid 3, respectively. Moreover, at the rotary center of the arc-shaped gears (52, 52) in the thin-plate sections (51b, 51b), locking tabs (51c, 51c) are disposed to project in the right and left directions toward the outer sides of the lid 3 coaxially with the fittings (56, 56), respectively.

First gear units (2h, 2h), and first guide units (2i 2i) protrude from the right and left opposite sideward walls (2d, 2d) of the body 2 in the right and left directions outwardly. The first gear units (2h, 2h) are formed as a lengthened thin-plated shape extending in the up/down direction, and is provided with first fixed gear 53 on the rearward surface, respectively. The gear teeth of the first fixed gears (53, 53) are arranged in the up/down direction. The first fixed gears (53, 53) mesh with the arc-shaped gears (52, 52) of the arms (51, 51), respectively. The first fixed gears (53, 53) change the rotary motion of the arc-shaped gears (53, 53) to a substantially vertical linear movement in the up/down direction. Note that the first fixed gears (53, 53) can be referred to as "first rack gears." Moreover, the arc-shaped gears (52, 52) can be referred to as "pinion gears."

Figure 5:
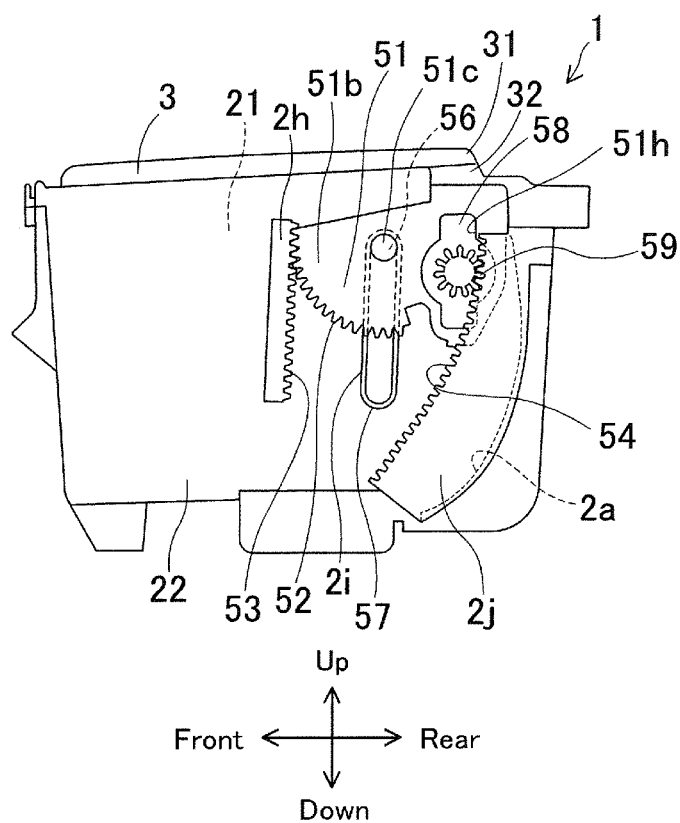
FIG. 5 is a right-side view illustrating the cup holder according to Embodiment when its lid is closed.

The guide units (2i, 2i) comprise a vertically long guide groove 57, respectively. The fittings (56, 56) of the lid 3 are fitted into the guide grooves (57, 57) from the opposite outer sides in the right and left directions, respectively. As illustrated in FIGS. 3 and 5, the fittings (56, 56) disposed to project from the arms (51, 51) are fitted into the guide grooves (57, 57) movably. Moreover, the guide grooves (57, 57) extend along the movement locus of the fittings (56, 56) moving as the lid 2 moves to open and close.

As illustrated in FIG. 5, an enclosure wall 2j, which is disposed to erect against the frontward side, is formed on the right-side end of the arc-shaped wall 2a that is formed rearward in the body 2. The second fixed gear 54, which curves gently, is formed in the forward-side rim of the enclosure wall 2j. The second fixed gear 54 meshes with a damper gear 59 of a damper 58 fixed in the right-side arm 51. The damper 58 is fitted into a recess 51h formed in the right-side arm 51.

Figure 6:
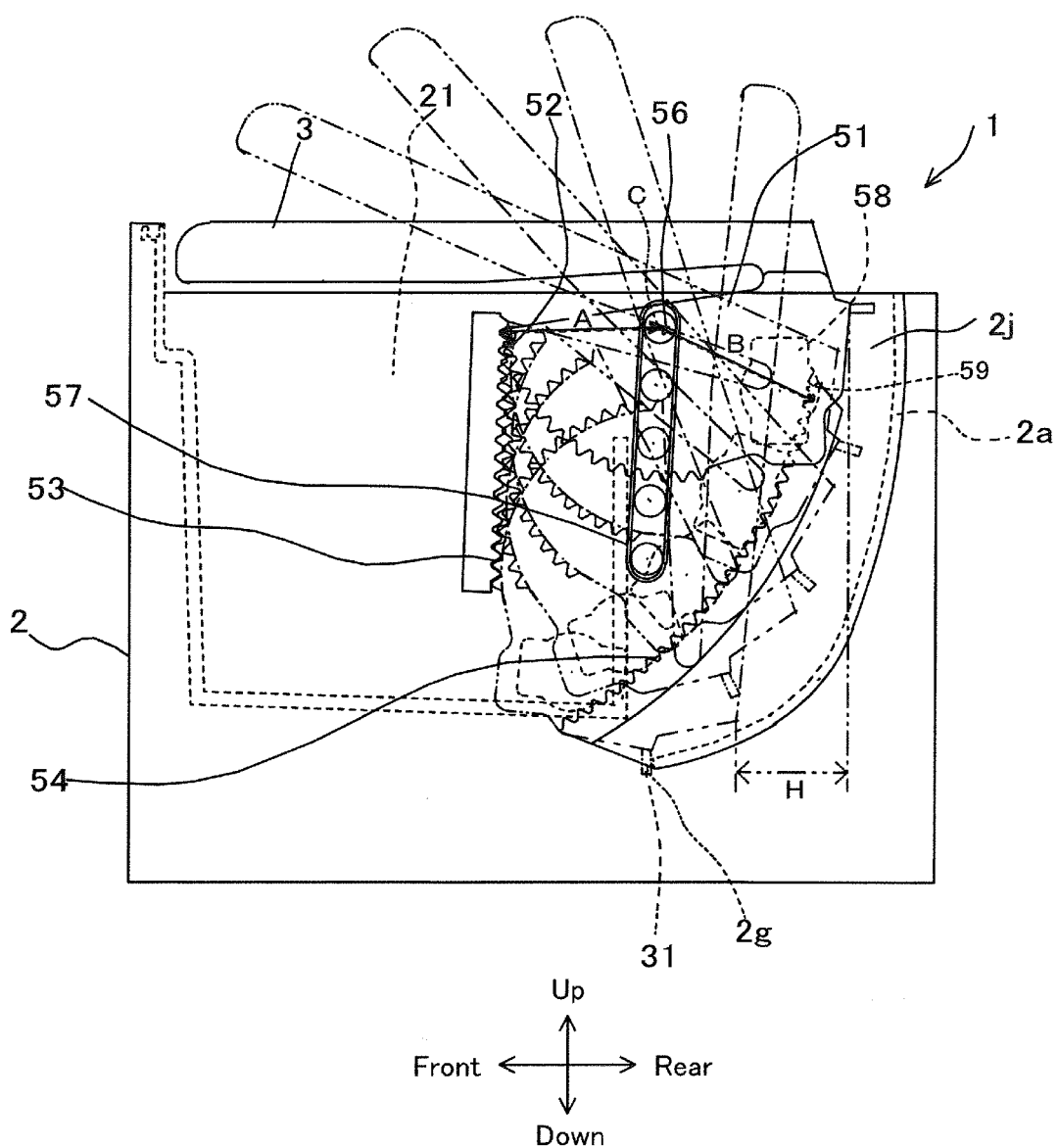
FIG. 6 is a right-side view for illustrating how the cup holder according to Embodiment moves its lid to open and close.

As illustrated in FIG. 6, the second fixed gear 54 in the body 2 is placed on an opposite side to the first fixed gear 53 with the arm 51 interposed between the second fixed gear 54 and the first fixed gear 53, on the right side of the body 2. Note that the second fixed gear 54 can be referred to as a "second rack gear." As illustrated in the drawing, when labeling a distance from the rotary center "C" of the arc-shaped gear 52 to the meshed position between the arc-shaped gear 52 and the first fixed gear 53 as "A," and labeling another distance from the rotary center "C" of the arc-shaped gear 52 to the meshed position between the damper gear 59 and the second fixed gear 54 as "B," the distances "A" and "B" have such a relationship as "B">"A". The second fixed gear 54 meshing with the damper gear 59 has a longer length in the gear-teeth arrangement direction than the other length that the first fixed gear 53 meshing with the arc-shaped gear 52 has in the gear-teeth arrangement direction. Moreover, the first fixed gear 53 has gear teeth in a greater number than a number of gear teeth that the second fixed gear 54 has. In addition, the movement distance of the damper 58 is longer at the time of opening and closing the lid 3 than the movement distance of the arc-shaped gear 52.

Figure 4:
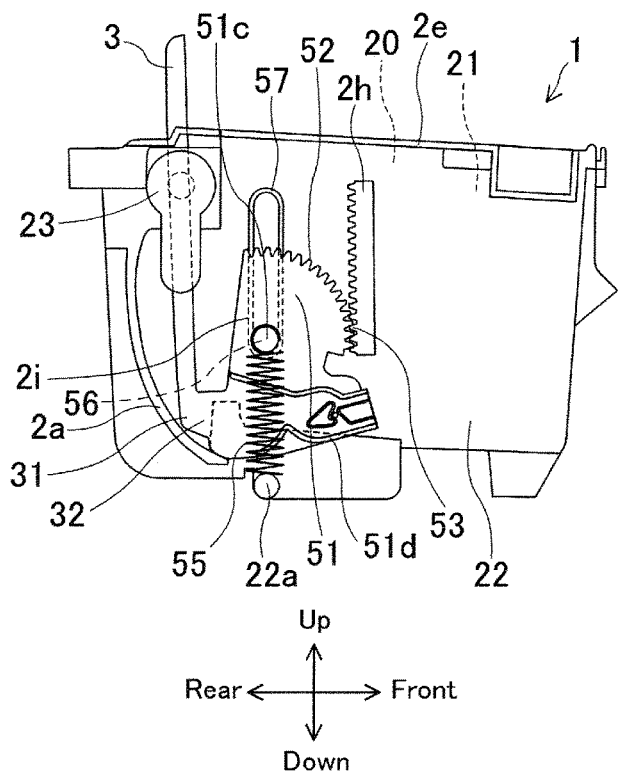
FIG. 4 is a left-side view illustrating the cup holder according to Embodiment when its lid is opened.

As illustrated in FIGS. 2 and 3, a tension spring 55 is disposed on the left side of the cup holder 1. The tension spring 55 is a tension coil spring, and extends in the up/down direction. The tension spring 55 is locked to the locking tab 51c of the left-side arm 51 at one of the opposite ends. Moreover, the tension spring 55 is locked to a locking element 22a protruding from the left-hand sideward wall 2d of the body 2. The tension spring 55 urges the left-side arm 51 in such a direction as moving it downward. As illustrated in FIG. 4, the arc-shaped gears (52, 52) of the arms (51, 51) move along the first fixed gears (53, 53) when the tensile spring 55 moves the left-side arm 51 downward. Then, the arms (51, 51) swing about the locking tabs (51c, 51c) placed at the rotary center of the arc-shaped gears (52, 52) to serve as the center. As illustrated in FIG. 5, the damper gear 59 of the damper 58, which is fixed to the rearward side in the right-side arm 51, descends along the second fixed gear 54 when the rotary center of the arc-shaped gears (52, 52) descends. As a result, the arms (51, 51) descend while rotating about the fittings (56, 56) serving as the rotary center of the thin-plate sections (51b, 51b). Thus, the lid 3 opens.

Figure 7:
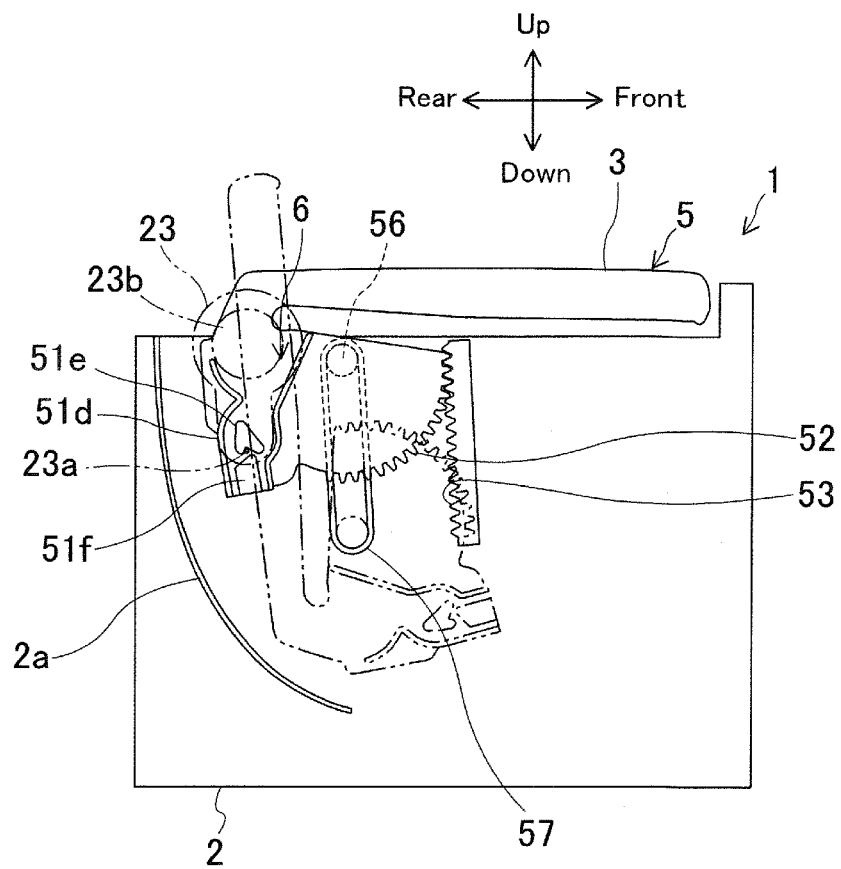
FIG. 7 is a left-side view for illustrating a heart cam mechanism in the cup holder according to Embodiment.
Figure 8:
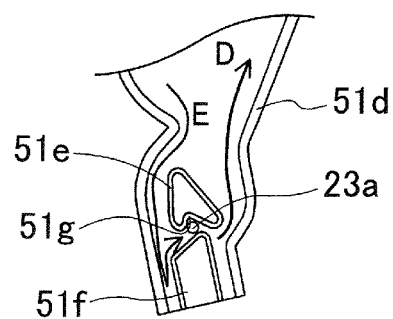
FIG. 8 is an explanatory diagram illustrating cam elements for the lid of the cup holder according to Embodiment.
Figure 9:
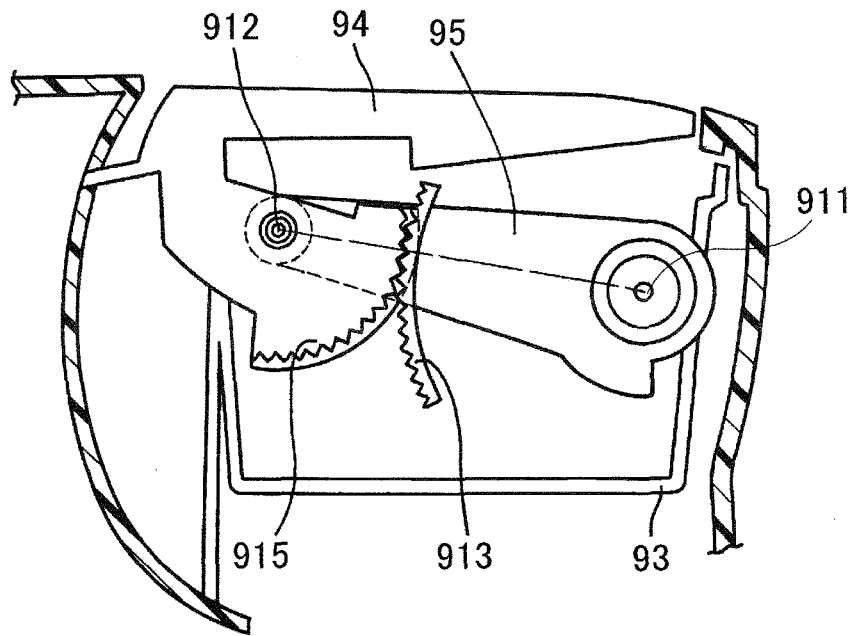
FIG. 9 is an explanatory diagram illustrating a lid opening/closing mechanism according to a conventional example.
Figure 10:
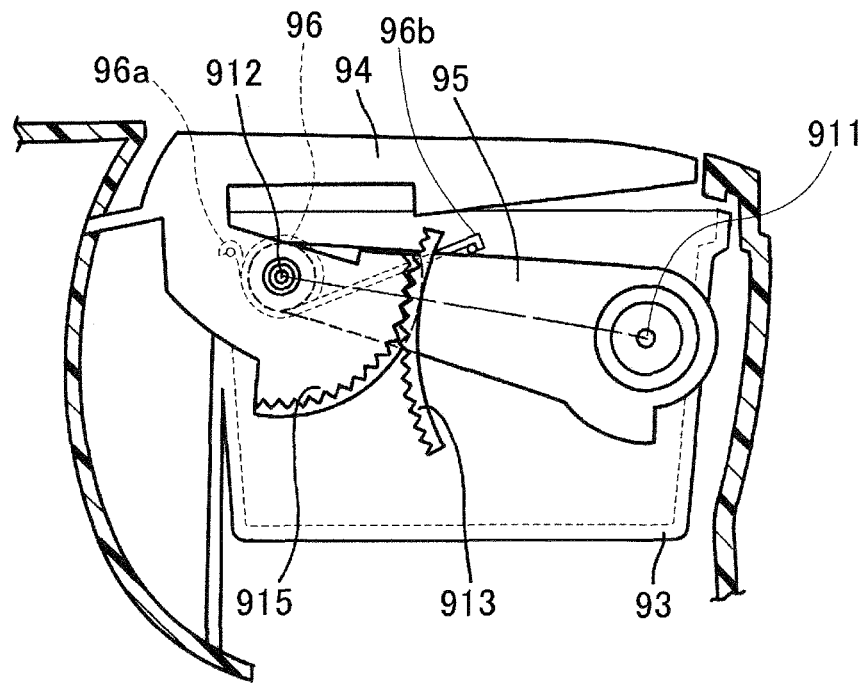
FIG. 10 is an explanatory diagram illustrating the lid opening/closing mechanism according to the conventional example furnished with a torsion coil spring.

Note herein that the opening/closing mechanism 5 further comprises a hear cam mechanism 6 for controlling the closed position of the lid 3, as shown in FIGS. 2 and 7. For example, the heart cam mechanism 6 includes a swing arm 23, and a cam 51d. The swing arm 23 is disposed on the left side of the body 23. The cam 51d is formed on the left-side arm 5 in the lid 3. As illustrated in FIG. 8, the cam 51d comprises a heart-shaped first island element 51e, and a rectangular second island element 51f, both of which are disposed to project from the left-side arm 5. As illustrated in FIG. 2, the swing arm 23 has a shaft 23b at the upper part. The shaft 23b is supported pivotally to a hole 22b, which is formed in a wall protruding more downward than is the left-side furnishing unit 2e in the body 2, byway of a washer 23c. Moreover, the shaft 23b has a pin 23a at the lower part. The pin 23a protrudes inward in the right/left direction. As illustrated in FIG. 8, the pin 23a is locked to a lower depression 51g in the first island element 51e when the lid 3 is placed at the closed position. When the lid 3 is pressed down on the forward side, the lid 3 is pushed up slightly at the rearward side. Accordingly, the cam 51d ascends, and thereby the pin 23a escapes from the depression 51g in the first island element 51e. Then, the pin 23a is led to a rearward-side open channel "D" by the inclined face of the second island element 51f. On the other hand, the lid 3 descends at the rear part by an urging force of the tension spring 55. As a result, the pin 23a attached to the body 2 ascends relatively through the open channel "D" of the cam 51d in the left-side arm 51. Then, when the rearward-side bulged elements 32b of the lid 3 come in contact with a stopper 2g formed at the lower end of the arc-shaped wall 2a of the body 2, the lid 3 stops moving. The position of the lid 3 under the circumstances is referred to as the "closed position."

Moreover, when the lid 3 is put down at the front part forwardly from the closed position, the lid 3 is pushed up at the rear part. Then, the pin 23a passes through a forward-side close channel "E" of the first island element 51e in the cam 51d. When the lid 3 is further pushed down on the forward side beyond the closed position, the lid 3 is pushed up slightly on the rearward side beyond the closed position. Accordingly, the pin 23a disposed on the rearward side of the body 2 moves downward relatively beyond the first island element 51e temporarily. Subsequently, when the lid 3 is released from the pushing-down force on the forward side, the lid 3 descends on the rearward side. Consequently, the cam 51d of the lid 3 goes down, and thereby the pin 23a is locked to the depression 51g in the first island element 51e. Thus, the lid 3 is controlled to stay at the closed position.

In accordance with the cup holder 1 constructed as described above, the arc-shaped gears (52, 52) formed in the arms (51, 51) of the lid 3 mesh with the first fixed gears (53, 53) formed in the body 2, whereas the damper gear 59 of the damper 58 disposed in the right-side arm 5 meshes with the right-side second fixed gear 54 formed in the body 2. Thus, the meshing between the arc-shaped gears (52, 52) and the first fixed gears (53, 53), and the meshing between the damper gear 59 and the right-side second fixed gear 54 hold the lid 2 onto the body 2. Moreover, the first fixed gears (53, 53) extend vertically substantially, whereas the second fixed gear 54 extends while inclining from the rearward side to the forward side against the downward direction (as shown in FIG. 5). Therefore, the first fixed gears (53, 53) and second fixed gear 54 support gravities acting on the arms (51, 51) to prevent the arms (51, 51) from falling down by the gravities.

The arc-shaped gears (52, 52) formed in the arms (51, 51) mesh with the first fixed gears (53, 53), and move downward and upward in the gear-teeth arrangement direction of the first fixed gears (53, 53). The thus moving arc-shaped gears (52, 52) swing the arms (51, 51) while moving the arms (51, 51) downward and upward in the gear-teeth arrangement direction of the first fixed gears (53, 53), and thereby the lid 3 opens and closes. While interlocking with the movements of the arms (51, 51), the damper 8 moves downward and upward in the gear-teeth arrangement direction of the second fixed gear 54. Hence, the lid 3 opens and closes while being held by the first fixed gears (53, 53) and second fixed gear 54.

Note that a first length, which the second fixed gear 54 meshing with the damper gear 59 has in the gear-teeth arrangement direction, is longer than a second length, which the first fixed gears (53, 53) meshing with the arc-shaped gears (52, 52) have in the gear-teeth arrangement direction. Lengthening the first length of the second fixed gear 54 in the gear-teeth arrangement direction not only results in making it possible to increase the number of gear teeth in the second fixed gear 54, but also results in making it possible to increase the number of revolutions in the damper gear 59 at the time of opening and closing the lid 3. Accordingly, the lid 3 can be controlled in the moving speed freely at will. Consequently, operators or users can open and close the lid 3 smoothly.

Changing the gear-teeth arrangement direction of the first fixed gears (53, 53) results in making it possible to change the swing locus of the arms (51, 51). Accordingly, it is possible to reduce the width "H" (see FIG. 6) in the swing locus of the arms (51, 51) swinging as the lid 3 opens and closes. Consequently, it is possible to reduce the entire space required for the opening/closing mechanism 5 in the lid 3. In the present embodiment, the width "H" of the swing locus of the first fixed gears (53, 53) becomes narrower than an imaginary width "H" of the swing locus of the first fixed gears (53, 53) when the gear-teeth arrangement direction is put in the vertical direction, because the gear-teeth arrangement direction of the first fixed gears (53, 53) inclines slightly forward against the downward direction, as shown in FIGS. 3 through 7. Moreover, the width "H" of the swing locus of the first fixed gears (53, 53) becomes much narrower when the first fixed gears (53, 53) are formed as a configuration swelling out forward furthermore.

The lid opening/closing mechanism 5 for the cup holder 1 according to Embodiment comprises the tensile spring 55 serving as an urging member for urging the lid 3 in the opening direction. The tensile spring 55 exhibits a large tensile force relatively. Accordingly, an enlarged initial torque can be applied to the lid 3 in the opening direction when moving the lid 3 from the closed position to the opened position. Consequently, the lid 3 can be opened smoothly without using any auxiliary or supplementary spring.

In accordance with the lid opening/closing mechanism 5 for the cup holder 1 according to Embodiment, the arms (51, 51), which include the arc-shaped gears (52 52) and the damper 58, the tension spring 55, and the body 2, which includes the first fixed gears (53, 53) and the second gear 54, enable an operator or user to open and close the lid 3 smoothly. Thus, the present lid opening/closing mechanism 5 has less number of component parts, because it does not comprise any link arm that has been heretofore needed conventionally. Hence, it is possible for assembly workers or robots to assemble the present lid opening/closing mechanism 5 enables with less man-hour requirements.

In accordance with the lid opening/closing mechanism 5 for the cup holder 1 according to Embodiment, the second fixed gear 54 is placed on an opposite side to the first fixed gear 53 with the swing center of the arms (51, 51) interposed between the first fixed gear 53 and the second fixed gear 54. As a result, the arms (51, 51) can be held more stably between the first fixed gear 53 and the second fixed gear 54.

In accordance with the lid opening/closing mechanism 5 for the cup holder 1 according to Embodiment, the body 2 comprises the guide grooves (57, 57). The grooves (57, 57) are made so that the fittings (56, 56) disposed to project from the arms (51, 51) are fitted movably into the guide grooves (57, 57), respectively. Moreover, the guide grooves (57, 57) are formed so as to extend along the movement locus of the fittings (56, 56) moving as the lid 3 moves to open and close. Accordingly, the fittings (56, 56) formed on the arms (51, 51) move along the guide grooves (57, 57) formed in the body 2. Consequently, the guide grooves (57, 57) enable the arms (51, 51) to swing more smoothly and without getting rickety or wobbly.

In accordance with the lid opening/closing mechanism 5 the cup holder 1 according to Embodiment, the fittings (56, 56) are placed at the swing center of the arms (51, 51). Not being limited to the arrangement, it is also allowable to arrange the fittings (56, 56) at any location in the arms (51, 51). Moreover, although the fittings (56, 56) and the guide grooves (57, 57) into which the fittings (56, 56) are fitted are disposed on both of the opposite right and left sides of the lid 3 and body 2, it is even permissible to dispose one of the fittings (56, 56) and one of the guide grooves (57, 57) on one of the opposite sides of the lid 3 and body 2 alone. In addition, it is even allowable that the lid 3 and body 2 can be free from the fittings (56, 56) and guide grooves (57, 57).

In accordance with the lid opening/closing mechanism 5 for the cup holder 1 according to Embodiment, the damper 58 and tension spring 55 are disposed on the right-side arm 51 alone, namely, only on one of the arms (51, 51) on the opposite right and left sides of the lid 3. However, it is also allowable to dispose the damper 58 and tensile spring 55 on both of the arms (51, 51) on the opposite right and left side of the lid 3. When the lid 3 is provided with the dampers (58, 58) on both of the opposite right and left sides, it is necessary to provide the body 2 with the second fixed gears (54, 54), which mesh with the dampers (58, 58), on both of the opposite right and left sides.

The lid opening/closing mechanism 5 is installed for the lid 3 in the cup holder 1 according to Embodiment. However, not being limited to cup holders, it is possible to install the present lid opening/closing mechanism 5 in the other vehicular passenger-room interior parts, such as storage boxes.

Note that it is possible to hold a lid in an openable/closable manner onto a body even with a lid opening/closing mechanism being free from any damper and second fixed gear; but comprising: a fitting that is disposed in the lid; and a guide groove that is formed in the body, and into which the fitting is fitted movably. That is, another optional lid opening/closing mechanism can be a lid opening/closing mechanism for a lid opening and closing an opening formed in a body, and the other optional lid opening/closing mechanism can comprise:

an arm disposed integrally to project from the lid to swing about a swing center as the lid opens and closes;

an arc-shaped gear formed in the arm;

a first fixed gear disposed in the body, and meshing with the arc-shaped gear;

a fitting disposed to project from the arm;

a guide groove which is formed in the body, into which the fitting is fitted movably, and which extends along a movement locus of the fitting moving as the lid moves to open and close; and a tensile spring disposed between the arc-shaped gear and the body to urge the lid in an opening direction.

Having now fully described the present invention, it will be apparent to one of ordinary skill in the art that many changes and modifications can be made thereto without departing from the spirit or scope of the present invention as set forth herein including the appended claims.

What is claimed is:

1. A lid opening/closing mechanism for a lid opening and closing an opening formed in a body, the lid opening/closing mechanism comprising:

an arm disposed integrally to project from the lid to swing about a swing center as the lid opens and closes;

an arc-shaped gear formed in the arm;

a first fixed gear disposed in the body, and meshing with the arc-shaped gear;

a damper disposed in the arm, and including a damper gear;

a second fixed gear disposed in the body, formed along a movement locus of the damper moving as the lid moves to open and close, and meshing with the damper gear;

a tension spring disposed between the body and the arc-shaped gear to urge the lid in an opening direction, a fitting disposed to project from the arm; and a guide groove which is formed in the body, into which the fitting is fitted movably, and which extends along a movement locus of the fitting moving as the lid moves to open and close.

2. The lid opening/closing mechanism according to claim 1, wherein the second fixed gear faces the first fixed gear with the arm interposed therebetween.

3. The lid opening/closing mechanism according to claim 1, wherein:

the fitting is placed at the swing center of the arm; and
the guide groove extends in parallel with the first fixed gear.

4. The lid opening/closing mechanism according to claim 1 further comprising:

another arm disposed integrally to project from the lid to swing about a swing center as the lid opens and closes, and disposed on another side of the lid to pair with the arm;

another arc-shaped gear formed in the other arm; and
another first fixed gear disposed in the body on another side thereof with respect to the first fixed gear, and meshing with the other arc-shaped gear.

5. The lid opening/closing mechanism according to claim 4, wherein:

the another arm is not connected to the damper including the damper gear, and the tension spring; and
the arm comprises the damper including the damper gear, and the tension spring.

6. The lid opening/closing mechanism according to claim 1, wherein the first fixed gear comprises a linear gear.

7. The lid opening/closing mechanism according to claim 6, wherein the linear gear inclines toward opposite to the side that the first fixed gear is disposed in the body, from a top section of the linear gear to a bottom section thereof.

8. The lid opening/closing mechanism according to claim 1, wherein the second fixed gear comprises an arced gear.

9. A lid opening/closing mechanism for a lid opening and closing an opening formed in a body, the lid opening/closing mechanism comprising:

an arm disposed integrally to project from the lid to swing about a swing center as the lid opens and closes;

an arc-shaped gear formed in the arm;

a first fixed gear disposed in the body, and meshing with the arc-shaped gear;

a damper disposed in the arm, and including a damper gear;

a second fixed gear disposed in the body, formed along a movement locus of the damper moving as the lid moves to open and close, and meshing with the damper gear; and a tension spring disposed between the body and the arc-shaped gear to urge the lid in an opening direction, wherein the first fixed gear comprises a linear gear, and wherein the second fixed gear comprises an arced gear.

10. The lid opening/closing mechanism according to claim 9, wherein the linear gear inclines toward opposite to the side that the first fixed gear is disposed in the body, from a top section of the linear gear to a bottom section thereof.

* * * * *